US012670663B2

(12) United States Patent　　　　(10) Patent No.:　US 12,670,663 B2

Xu et al.　　　　　　　　　　　　　(45) Date of Patent:　Jun. 30, 2026

(54) THREE-DIMENSIONAL POINT CLOUD TRANSMISSION METHOD AND APPARATUS, THREE-DIMENSIONAL POINT CLOUD RECEIVING METHOD AND APPARATUS, AND STORAGE MEDIUM

(71) Applicant: SHANGHAI JIAO TONG UNIVERSITY, Shanghai (CN)

(72) Inventors: Yiling Xu, Shanghai (CN); Yujie Zhang, Shanghai (CN); Linyao Gao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 320 days.

(21) Appl. No.: 18/550,819

(22) PCT Filed: May 13, 2022

(86) PCT No.: PCT/CN2022/092632

§ 371 (c)(1),
(2) Date: Sep. 15, 2023

(87) PCT Pub. No.: WO2022/194309

PCT Pub. Date: Sep. 22, 2022

(65) Prior Publication Data

US 2024/0221305 A1　　Jul. 4, 2024

(30) Foreign Application Priority Data

Mar. 15, 2021　(CN) ......................... 202110277373.3
Apr. 23, 2021　(CN) ......................... 202110441806.4
Jun. 11, 2021　(CN) ......................... 202110653948.7

(51) Int. Cl.
*G06T 17/00*　　　(2006.01)
*G06T 9/00*　　　(2006.01)

(52) U.S. Cl.
CPC .............. *G06T 17/00* (2013.01); *G06T 9/001* (2013.01)

(58) Field of Classification Search
None
See application file for complete search history.

(56) References Cited

U.S. PATENT DOCUMENTS 11,017,566 B1 *　5/2021　Tourapis ................. G06T 9/001
11,367,247 B2 *　6/2022　Thudor ..................... G06T 9/00
(Continued)

FOREIGN PATENT DOCUMENTS

CN　　　108965929 A　　12/2018
CN　　　110347265 A　　10/2019
(Continued)

OTHER PUBLICATIONS

Hosseini et al., Dynamic Adaptive Point Cloud Streaming, 2019 (Year: 2019).*

(Continued)

*Primary Examiner* — Phong X Nguyen
(74) *Attorney, Agent, or Firm* — ArentFox Schiff LLP

(57) ABSTRACT

Provided are a three-dimensional point cloud transmission method and apparatus, a three-dimensional point cloud receiving method and apparatus, and a medium. The transmission method includes the following steps. The point cloud data of an original point cloud is parsed. The quality level of the space region of a to-be-transmitted point cloud is determined. The point cloud data in the space region of the to-be-transmitted point cloud is selected according to the quality level of the space region of the to-be-transmitted point cloud to generate a media code stream. The quality indication information of the space region of the to-be-transmitted point cloud is determined according to the selected point cloud data in the space region of the to-be- (Continued)

transmitted point cloud. The quality indication information of the space region of the to-be-transmitted point cloud is written into the media code stream. The media code stream is transmitted.

12 Claims, 5 Drawing Sheets

(56)         References Cited

U.S. PATENT DOCUMENTS

| | | | | |
|---|---|---|---|---|
| 11,557,025 | B2* | 1/2023 | Chen | H04N 21/44008 |
| 2019/0087979 | A1* | 3/2019 | Mammou | H04N 19/597 |
| 2019/0158564 | A1* | 5/2019 | Wang | H04N 21/23805 |
| 2020/0014953 | A1* | 1/2020 | Mammou | H04N 19/17 |
| 2020/0202608 | A1* | 6/2020 | Mekuria | H04L 65/80 |
| 2021/0042982 | A1 | 2/2021 | Trajkovic et al. | |
| 2021/0329052 | A1* | 10/2021 | Oh | H04L 65/762 |
| 2021/0343069 | A1* | 11/2021 | Takahashi | G06T 15/20 |
| 2021/0360219 | A1* | 11/2021 | Wang | H04N 13/111 |
| 2022/0038517 | A1* | 2/2022 | Takahashi | H04N 21/816 |
| 2022/0343551 | A1* | 10/2022 | Iguchi | G06T 9/001 |
| 2022/0377327 | A1* | 11/2022 | Park | H04N 19/167 |
| 2024/0221305 | A1* | 7/2024 | Xu | G06T 9/001 |

FOREIGN PATENT DOCUMENTS

| | | | |
|---|---|---|---|
| CN | 111327906 | A | 6/2020 |
| CN | 111699690 | A | 9/2020 |
| CN | 112019857 | A | 12/2020 |
| CN | 112449171 | A | 3/2021 |
| CN | 113709093 | A | 11/2021 |
| CN | 113746797 | A | 12/2021 |
| CN | 113963103 | A | 1/2022 |
| WO | 2019141907 | A1 | 7/2019 |
| WO | 2020137642 | A1 | 7/2020 |
| WO | 2021002562 | A1 | 1/2021 |
| WO | 2021002594 | A1 | 1/2021 |

OTHER PUBLICATIONS

Schwarz et al., Emerging MPEG Standards for Point Cloud Compression, 2019 (Year: 2019).*
Subramanyam et al., User Centered Adaptive Streaming of Dynamic Point Clouds with Low Complexity Tiling, 2020 (Year: 2020).*
Office Action dated Apr. 6, 2022 from priorChinese Application No. 202110653948.7.
Office Action dated Apr. 8, 2022 from prior Chinese Application No. 202110441806.4.
Office Action dated Sep. 8, 2022 from prior Chinese Application No. 202110653948.7.
Office Action dated Sep. 8, 2022 from prior Chinese Application No. 202110441806.4.
Office Action dated Dec. 30, 2022 from prior Chinese Application No. 202110441806.4.
Office Action dated Dec. 30, 2022 from prior Chinese Application No. 202110653948.7.
International Search Report dated Jun. 22, 2022 from corresponding PCT Application No. PCT/CN2022/092632.

* cited by examiner

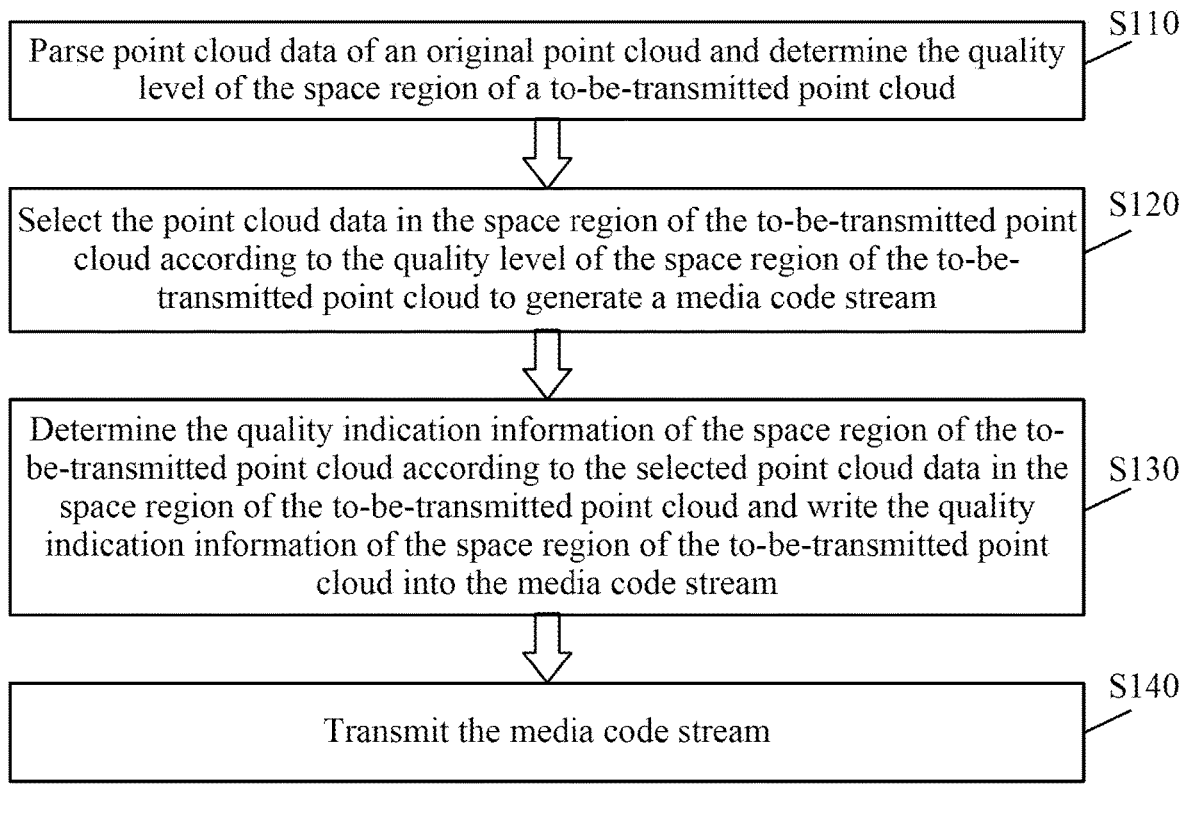

S110

Parse point cloud data of an original point cloud and determine the quality level of the space region of a to-be-transmitted point cloud

S120

Select the point cloud data in the space region of the to-be-transmitted point cloud according to the quality level of the space region of the to-be-transmitted point cloud to generate a media code stream

S130

Determine the quality indication information of the space region of the to-be-transmitted point cloud according to the selected point cloud data in the space region of the to-be-transmitted point cloud and write the quality indication information of the space region of the to-be-transmitted point cloud into the media code stream

S140

Transmit the media code stream

FIG. 1

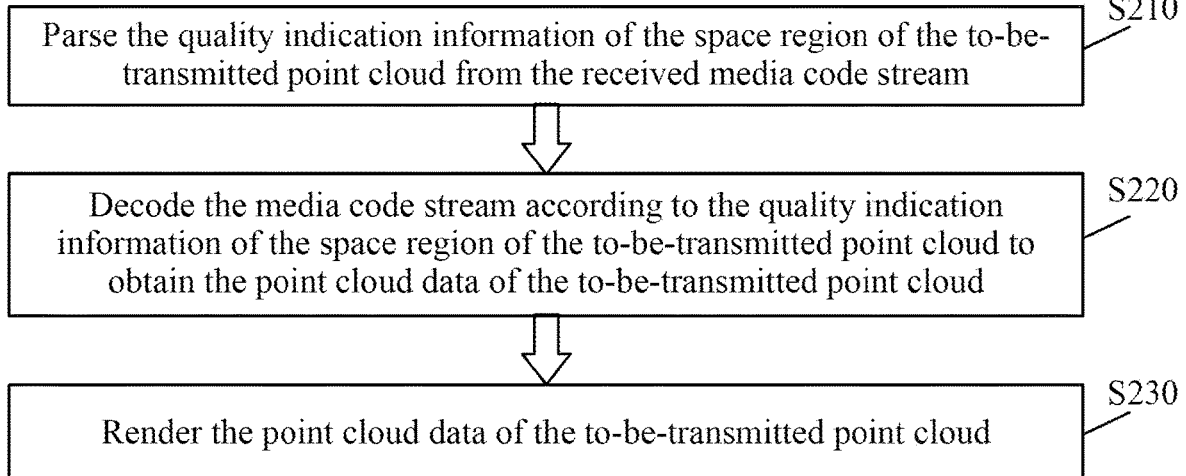

S210

Parse the quality indication information of the space region of the to-be-transmitted point cloud from the received media code stream

S220

Decode the media code stream according to the quality indication information of the space region of the to-be-transmitted point cloud to obtain the point cloud data of the to-be-transmitted point cloud

S230

Render the point cloud data of the to-be-transmitted point cloud

FIG. 2

THREE-DIMENSIONAL POINT CLOUD TRANSMISSION METHOD AND APPARATUS, THREE-DIMENSIONAL POINT CLOUD RECEIVING METHOD AND APPARATUS, AND STORAGE MEDIUM

CROSS REFERENCE TO RELATED APPLICATION(S)

This application is a national stage application filed under 35 U.S.C. 371 based on International Patent Application No. PCT/CN2022/092632, filed on May 13, 2022, which claims priority to Chinese Patent Application No. 202110277373.3 filed with the China National Intellectual Property Administration (CNIPA) on Mar. 15, 2021, Chinese Patent Application 202110441806.4 filed with CNIPA on Apr. 23, 2021, and Chinese Patent Application No. 202110653948.7 filed with CNIPA on Jun. 11, 2021, the disclosures of which are incorporated herein by reference in their entireties.

TECHNICAL FIELD

The present application relates to the field of multimedia technology, for example, a three-dimensional point cloud transmission method and apparatus, a three-dimensional point cloud receiving method and apparatus, and a storage medium.

BACKGROUND

With the rapid development of information technology, the consumption mode based on words, pictures and traditional videos is almost mature, and more realistic, more interactive and more diversified visual communication gradually become a development hotspot. Visual communication provides a user with an immersive real-world experience not restricted by time, regions and realistic conditions by using techniques including accurately rendered three-dimensional point cloud, omni-directional six-degrees-of-freedom experience, virtuality and reality combination and real-time interaction. Moreover, visual communication provides infinite space for new applications.

Visual media data is greatly different from traditional media data in terms of data generation, data transmission, data processing and data presentation. Visual media data is more complex and diversified than traditional media data. To satisfy presentation requirements of the user, the corresponding data description method has received extensive attention. Thanks to the increasing maturity of the three-dimensional scanning technology and system, three-dimensional point cloud data has attracted extensive attention in the academic and industrial circles.

A three-dimensional point cloud is a set of data points in space and records a set of three-dimensional coordinate information and various attribute information, such as texture, material, color, occupation map, normal vector, reflection intensity, and feature, about each point of the surface of a scanned object. Three-dimensional point cloud data is a geometric description of a real object and is a new three-dimensional model data format. As a main carrier for expressing information in a visual communication scenario, three-dimensional point cloud data can not only effectively represent a static object or scene in a visual media service, but can also render an accurate three-dimensional model in real time to truly describe information about a dynamic object or scene. Therefore, three-dimensional point cloud data enables the user to enjoy an immersive consumption experience featured by virtuality and reality combination and real-time interaction.

At present, some researches are made on how to store and transmit three-dimensional point cloud data. However, at present, during transmission, multiple space regions of a three-dimensional point cloud are generally transmitted by using the same quality. Data volumes corresponding to point clouds of different qualities are different. If a low-quality point cloud is used, the overall perceived quality will be affected. If a high-quality point cloud is used, the to-be-transmitted data volume is very large. In the related art, there are defects in encapsulation and transmission of three-dimensional point cloud data.

SUMMARY

The present application provides a three-dimensional point cloud transmission method and apparatus, a three-dimensional point cloud receiving method and apparatus, and a storage medium.

The three-dimensional point cloud transmission method according to the present application includes the steps below.

The point cloud data of an original point cloud is parsed. The quality level of the space region of a to-be-transmitted point cloud is determined.

The point cloud data in the space region of the to-be-transmitted point cloud is selected according to the quality level of the space region of the to-be-transmitted point cloud to generate a media code stream.

The quality indication information of the space region of the to-be-transmitted point cloud is determined according to the selected point cloud data in the space region of the to-be-transmitted point cloud. The quality indication information of the space region of the to-be-transmitted point cloud is written into the media code stream.

The media code stream is transmitted.

The original point cloud is composed of point cloud data of different space regions and different quality levels. At least one space region of the to-be-transmitted point cloud is configured. Each space region includes point cloud data of at least one quality level. The quality indication information of the space region of the to-be-transmitted point cloud includes the quality level of the space region of the to-be-transmitted point cloud.

The three-dimensional point cloud receiving method according to the present application includes the steps below.

The quality indication information of the space region of the to-be-transmitted point cloud is parsed from the received media code stream.

The media code stream is decoded according to the quality indication information of the space region of the to-be-transmitted point cloud to obtain the point cloud data of the to-be-transmitted point cloud.

The point cloud data of the to-be-transmitted point cloud is rendered.

The point cloud data is point cloud data of different space regions and different quality levels in the to-be-transmitted point cloud. The quality indication information of the space region includes the quality level of the space region.

The three-dimensional point cloud transmission apparatus according to the present application includes a point cloud parsing module, a quality level determination module, a point cloud data selection module, a quality indication information determination module, an encapsulation module, and a transmission module.

The point cloud parsing module is configured to parse the point cloud data of the original point cloud.

The quality level determination module is configured to determine the quality level of the space region of the to-be-transmitted point cloud.

The point cloud data selection module is configured to select the point cloud data in the space region of the to-be-transmitted point cloud according to the quality level of the space region of the to-be-transmitted point cloud to generate the media code stream.

The quality indication information determination module is configured to determine the quality indication information of the space region of the to-be-transmitted point cloud according to the selected point cloud data in the space region of the to-be-transmitted point cloud.

The encapsulation module is configured to write the quality indication information of the space region of the to-be-transmitted point cloud into the media code stream.

The transmission module is configured to transmit the media code stream.

The original point cloud is composed of point cloud data of different space regions and different quality levels. At least one space region of the to-be-transmitted point cloud is configured. Each space region includes point cloud data of at least one quality level. The quality indication information of the space region of the to-be-transmitted point cloud includes the quality level of the space region of the to-be-transmitted point cloud.

The three-dimensional point cloud receiving apparatus according to the present application includes a quality indication information parsing module, a decoding module, and a rendering module.

The quality indication information parsing module is configured to parse the quality indication information of the space region of the to-be-transmitted point cloud from the received media code stream.

The decoding module is configured to decode the media code stream according to the quality indication information of the space region of the to-be-transmitted point cloud to obtain the point cloud data of the to-be-transmitted point cloud.

The rendering module is configured to render the point cloud data of the to-be-transmitted point cloud.

The point cloud data is point cloud data of different space regions and different quality levels in the to-be-transmitted point cloud. The quality indication information of the space region includes the quality level of the space region.

A computer-readable storage medium provided in the present application stores a computer program. When executing the computer program, a processor performs the preceding transmission method and/or the preceding receiving method.

BRIEF DESCRIPTION OF DRAWINGS

FIG. 1 is a flowchart of a three-dimensional point cloud transmission method according to an embodiment of the present application.

FIG. 2 is a flowchart of a three-dimensional point cloud receiving method according to an embodiment of the present application.

DETAILED DESCRIPTION

Figure 3:
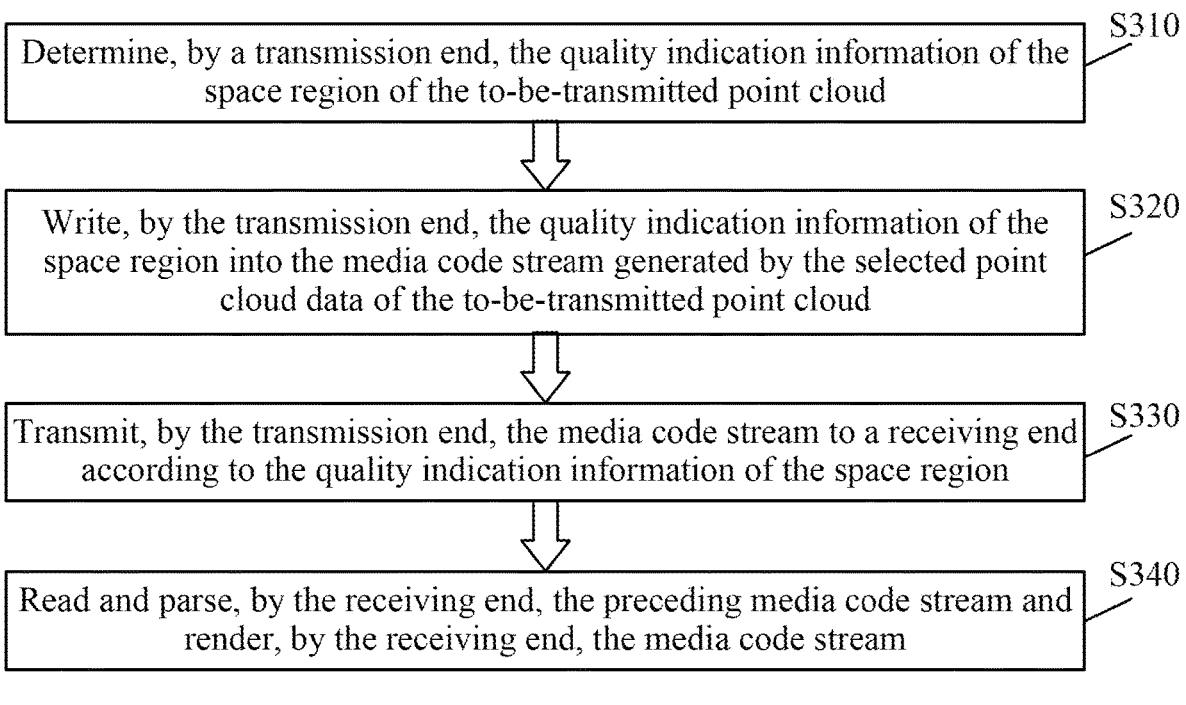
FIG. 3 is a flowchart of a three-dimensional point cloud encapsulation method and consumption according to an embodiment of the present application.

FIG. 1 is a flowchart of a point cloud transmission method. The method can be applied by a server end. An original point cloud is composed of point cloud data of different space regions and different quality levels. Each space region includes point cloud data of at least one quality level. The quality indication information of the space region includes information of the quality level of the space region. After the point cloud data of the original point cloud is parsed, it can be determined which quality levels of point cloud data exist in each space region of the original point cloud. The division of the space region is related to the inherent attribute of the point cloud data included in the original point cloud, so that the division of the space region of the original point cloud and the division of the space region of a to-be-transmitted point cloud are consistent. According to the user's request information (such as a user position and an angle of sight), a relevant space region for transmission may be selected from multiple space regions of the original point cloud and used as the space region of the to-be-transmitted point cloud. The quality level of the space region of the to-be-transmitted point cloud is determined, and the point cloud data corresponding to the quality level is selected from the space region of the to-be-transmitted point cloud and used as the point cloud data of the space region of the to-be-transmitted point cloud.

A three-dimensional point cloud transmission method provided in an embodiment of the present application includes the steps below.

In S110, the point cloud data of an original point cloud is parsed, and the quality level of the space region of a to-be-transmitted point cloud is determined. This step is performed in a point cloud parsing module and a quality level determination module.

In S120, the point cloud data in the space region of the to-be-transmitted point cloud is selected according to the quality level of the space region of the to-be-transmitted point cloud to generate a media code stream. This step is performed in a point cloud data selection module.

In S130, the quality indication information of the space region of the to-be-transmitted point cloud is determined according to the selected point cloud data in the space region of the to-be-transmitted point cloud. The quality indication information of the space region of the to-be-transmitted point cloud is written into the media code stream. This step is performed in a quality indication information determination module and an encapsulation module.

In S140, the media code stream is transmitted. This step is performed in a transmission module.

In an embodiment, each space region includes at least one component track group. A component track group includes at least one component track. Each component track includes at least one type of point cloud data. Each type of point cloud data includes at least one quality level. The quality level of the space region of the to-be-transmitted point cloud is determined in the manner below.

The quality level of a component track in each component track group of each space region of the to-be-transmitted point cloud is determined.

The joint quality level of each component track group in each space region of the to-be-transmitted point cloud is determined.

The joint quality level of each component track group includes the quality level of each component track included in each component track group. The quality level of each component track is determined according to the quality level of at least one type of point cloud data included in each component track group.

In an embodiment, after the quality indication information of the space region of the to-be-transmitted point cloud is determined, the method also includes the steps below.

The indication attribute identifier of the to-be-transmitted point cloud is determined according to the quality indication information of the space region of the to-be-transmitted point cloud.

The indication attribute identifier of the to-be-transmitted point cloud is written into the media code stream.

The indication attribute identifier of the to-be-transmitted point cloud is configured to refer to at least one of the following: whether the to-be-transmitted point cloud is composed of point cloud data of different space regions and different quality levels, or the space region included in the to-be-transmitted point cloud.

In an embodiment, the point cloud data in the space region of the to-be-transmitted point cloud is selected according to the quality level of the space region of the to-be-transmitted point cloud to generate the media code stream in the manner below.

The point cloud data of the component track included in each component track group in the space region of the to-be-transmitted point cloud is selected according to the joint quality level of each component track group in the space region of the to-be-transmitted point cloud to form point cloud data of each component track group in the space region of the to-be-transmitted point cloud to generate the media code stream.

In an embodiment, the quality indication information of the space region of the to-be-transmitted point cloud also includes at least one of the following: the number of space regions, an identifier of the space region, a position of the space region, a dimension of the space region, a size of the space region, the number of component tracks of the space region, an identifier of a component track of the space region, a type of a component track group of the space region, the number of component track groups of the space region, or an identifier of the component track group of the space region.

In an embodiment, the quality indication information of the space region of the to-be-transmitted point cloud is determined according to the point cloud data selected from the corresponding space region of the original point cloud.

FIG. 2 is a flowchart of a three-dimensional point cloud receiving method according to an embodiment of the present application. The method can be applied by a client. The point cloud data is point cloud data of different space regions and different quality levels in the to-be-transmitted point cloud. The quality indication information of the space region includes the quality level of the space region. The method includes the steps below.

In S210, the quality indication information of the space region of the to-be-transmitted point cloud is parsed from the received media code stream. This step is performed by a quality indication information parsing module.

In S220, the media code stream is decoded according to the quality indication information of the space region of the to-be-transmitted point cloud to obtain the point cloud data of the to-be-transmitted point cloud. This step is performed by a decoding module.

In S230, the point cloud data of the to-be-transmitted point cloud is rendered. This step is performed by a rendering module.

In an embodiment, before the quality indication information of the space region of the to-be-transmitted point cloud is parsed from the received media code stream, the method also includes the steps below.

The indication attribute identifier of the to-be-transmitted point cloud is parsed from the received media code stream. Whether the to-be-transmitted point cloud is composed of point cloud data of different space regions is determined according to the indication attribute identifier of the to-be-transmitted point cloud.

In an embodiment, the quality indication information of the space region of the to-be-transmitted point cloud is parsed based on the determination result that the received transmission point cloud is composed of point cloud data of different space regions, and the media code stream is decoded according to the indication attribute identifier of the to-be-transmitted point cloud and/or the quality indication information of the space region. Based on the determination result that the received transmission point cloud is composed of the point cloud data of one space region, the media code stream is decoded according to the indication attribute identifier of the to-be-transmitted point cloud.

Figure 6:
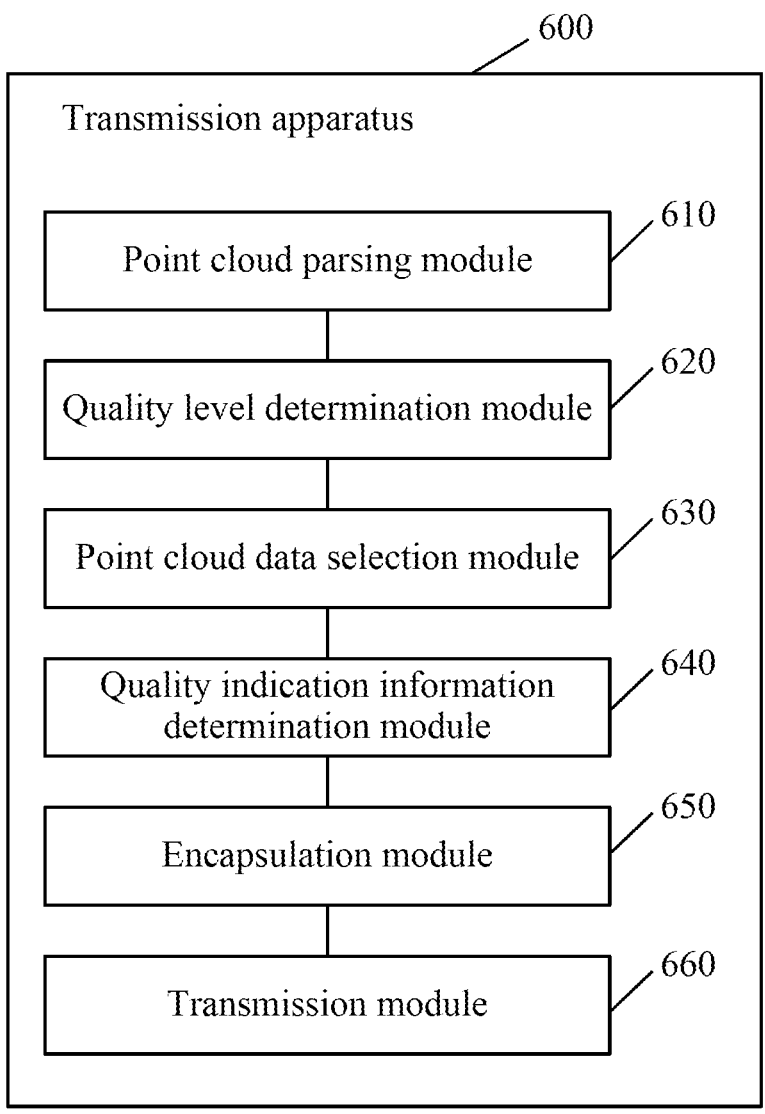
FIG. 6 is a diagram illustrating the structure of a three-dimensional point cloud transmission apparatus according to an embodiment of the present application.

FIG. 6 is a diagram illustrating the structure of a three-dimensional point cloud transmission apparatus 600 according to an embodiment of the present application. The transmission apparatus 600 includes a point cloud parsing module 610, a quality level determination module 620, a point cloud data selection module 630, a quality indication information determination module 640, an encapsulation module 650, and a transmission module 660.

The point cloud parsing module 610 is configured to parse the point cloud data of the original point cloud.

The quality level determination module 620 is configured to determine the quality level of the space region of the to-be-transmitted point cloud.

The point cloud data selection module 630 is configured to select the point cloud data in the space region of the to-be-transmitted point cloud according to the quality level of the space region of the to-be-transmitted point cloud to generate the media code stream.

The quality indication information determination module 640 is configured to determine the quality indication information of the space region of the to-be-transmitted point cloud.

The encapsulation module 650 is configured to write the quality indication information of the space region of the to-be-transmitted point cloud into the media code stream.

The transmission module 660 is configured to transmit the media code stream.

The original point cloud is composed of point cloud data of different space regions and different quality levels. At least one space region of the to-be-transmitted point cloud is configured. Each space region includes point cloud data of at least one quality level. The quality indication information of the space region of the to-be-transmitted point cloud includes the quality level of the space region of the to-be-transmitted point cloud.

In an embodiment, the transmission apparatus also includes a description module configured to determine the indication attribute identifier of the to-be-transmitted point cloud according to the quality indication information of the space region of the to-be-transmitted point cloud.

The encapsulation module 660 is also configured to write the indication attribute identifier of the to-be-transmitted point cloud into the media code stream.

Figure 7:
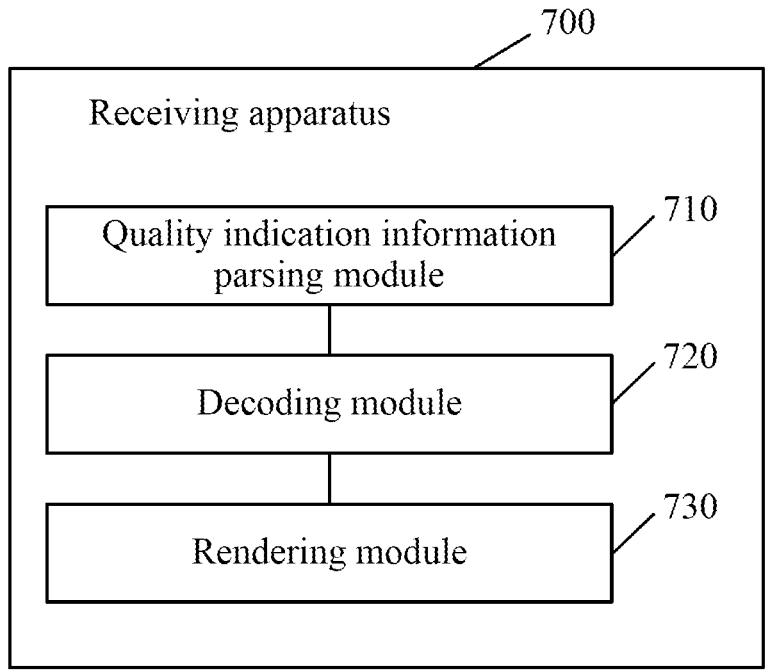
FIG. 7 is a diagram illustrating the structure of a three-dimensional point cloud receiving apparatus according to an embodiment of the present application.

FIG. 7 is a diagram illustrating the structure of a three-dimensional point cloud receiving apparatus 700 according to an embodiment of the present application. The receiving apparatus 700 includes a quality level indication information module 710, a decoding module 720, and a rendering module 730.

The quality level indication information module 710 is configured to parse the quality indication information of the space region of the to-be-transmitted point cloud from the received media code stream.

The decoding module 720 is configured to decode the media code stream according to the quality indication information of the space region of the to-be-transmitted point cloud to obtain the point cloud data of the to-be-transmitted point cloud.

The rendering module 730 is configured to render the point cloud data of the to-be-transmitted point cloud.

The point cloud data is point cloud data of different space regions and different quality levels in the to-be-transmitted point cloud. The quality indication information of the space region includes the quality level of the space region.

In an embodiment, the receiving apparatus 700 also includes an identifier parsing module configured to parse the indication attribute identifier of the to-be-transmitted point cloud from the received media code stream and determine whether the to-be-transmitted point cloud is composed of point cloud data of different space regions according to the indication attribute identifier of the to-be-transmitted point cloud.

An embodiment of the present application provides a computer-readable storage medium. The computer-readable storage medium stores a computer program. When executing the computer program, a processor performs the preceding transmission method described in the preceding embodiment and/or the preceding receiving method described in the preceding embodiment. The computer-readable storage medium may be a non-transient computer-readable storage medium.

FIG. 3 is a flowchart of a three-dimensional point cloud encapsulation method and consumption according to an embodiment of the present application. The encapsulation method and the consumption process include the steps below.

In S310, a transmission end determines the quality indication information of the space region of the to-be-transmitted point cloud.

In S320, the transmission end writes the quality indication information of the space region into the media code stream generated based on the selected point cloud data of the to-be-transmitted point cloud.

In S330, the transmission end transmits the media code stream to a receiving end according to the quality indication information of the space region.

In S340, the receiving end reads and parses the preceding media code stream, and renders the media code stream.

Figure 4:
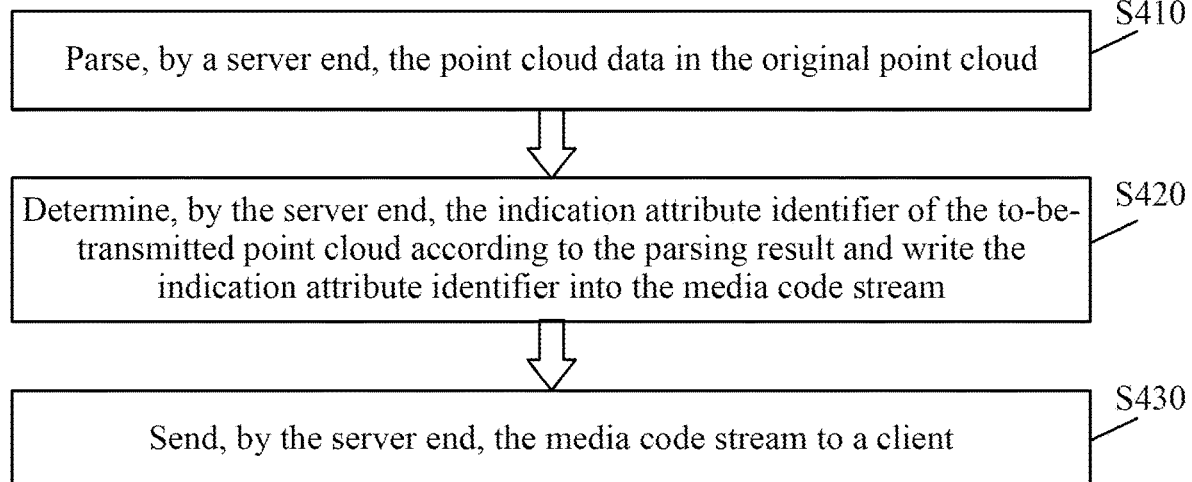
FIG. 4 is a flowchart of a three-dimensional point cloud description method according to an embodiment of the present application.

FIG. 4 is a flowchart of a three-dimensional point cloud description method according to an embodiment of the present application. The description method includes the steps below.

In S410, a server end parses the point cloud data in the original point cloud.

In S420, the server end determines the indication attribute identifier of the to-be-transmitted point cloud according to the parsing result and writes the indication attribute identifier into the media code stream.

In S430, the server end sends the media code stream to the client.

The three-dimensional point cloud transmission method provided in an embodiment of the present application mainly includes the step of parsing a point cloud, the step of determining the quality level of the space region, the step of selecting point cloud data, the step of determining the quality indication information, the step of describing an attribute, the step of encapsulating, and the step of transmitting.

a. The step of parsing the point cloud is performed in the point cloud parsing module. The point cloud data of the original point cloud is parsed. One original point cloud may be composed of several space regions or only one space region. Each space region may include point cloud data of several quality levels or point cloud data of only one quality level.

2. The step of determining the quality level of the space region is performed in the point cloud parsing module.

Figure 5:
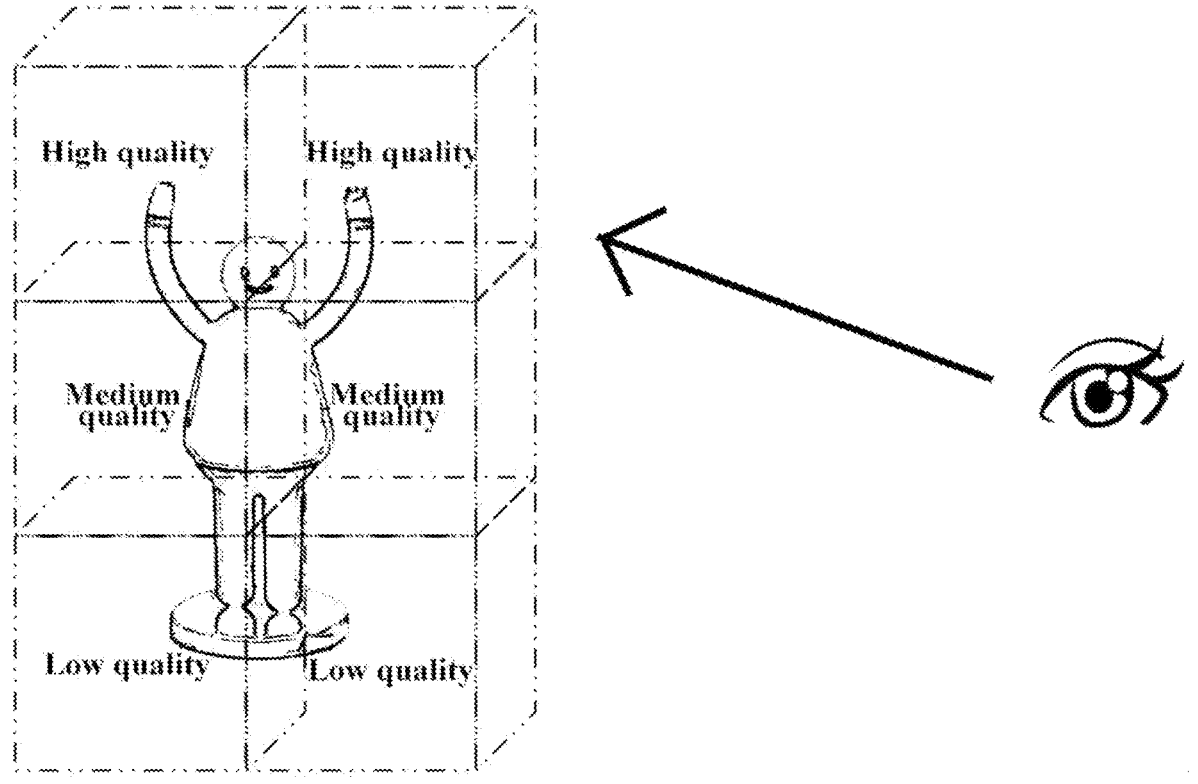
FIG. 5 is a diagram of the quality level setting of three-dimensional point cloud data in different space regions according to an embodiment of the present application.

When an original point cloud is composed of point cloud data of different space regions and different quality levels, the step is performed. There may be one or multiple original point clouds. Each original point cloud is composed of point cloud data of different quality levels. As shown in FIG. 5, the point cloud data of different space regions is divided into three quality levels, namely, a high quality, a medium quality, and a low quality respectively. The number of quality levels of point cloud data is set according to specific requirements and is not limited to the preceding three. Only one example case is shown in FIG. 5. The quality level of two space regions of the upper layer is the high quality. The quality level of two space regions of the middle layer is the medium quality. The quality level of two space regions of the lower layer is the low quality. In other embodiments, the quality level of the space regions of each layer may vary.

The point cloud data is classified into various types, such as geometry, occupation map, feature, attribute, auxiliary, color, texture, material, normal vector, and reflection intensity. A component track is composed of one or more types of point cloud data. In a space region, multiple component track groups may be formed by combinations of different component tracks. One component track group generally corresponds to one data stream that may be played in the space region. At the transmission end (a sending end), generally, it is only necessary to send one component track group to the receiving end for rendering and playing. Point cloud data of different quality levels is selected, so that different component tracks in the space region may be formed. In this manner, the component track group for transmission in the space region is updated or replaced in real time. Thus, the premise of selecting point cloud data is to first determine the quality level of the space region, and the key to determining the quality level of the space region is to determine the joint quality level of the component track group in the space region. The joint quality level of the component track group in the space region includes the quality level of each component track composing the component track group.

The quality level of the space region is determined in the following steps: The quality level of each component track in a component track group is determined; and the joint quality level of the component track group in the space region is determined. There is no order of the two substeps. For the quality level of each component track and the joint quality level of the component track group, if one of them is determined, the other is determined.

When there is only one original point cloud, the quality level of each space region of the original point cloud is determined. When there are multiple original point clouds, the quality level of the space region of each original point cloud is determined.

In an example embodiment, when the user moves, the head moves, and the position of the user and the angle of sight of the user will constantly change. The client or the server end determines the quality level of each space region according to information such as the position of the user and the angle of sight of the user to select point cloud data. The feedback information of the user may include request information for indicating the position of the user and the angle of sight of the user.

In an example embodiment, when the quality level of each space region is determined, the space region corresponding to the center position of the angle of sight is configured to be of a higher quality level, and the space region corresponding to the edge position of the angle of sight is configured to be of a lower quality level. For example, for a three-dimensional point cloud model of a single character, the user's angle of sight may constantly change. When the user's angle of sight is focused on the upper body region of the character, such as a head, the corresponding region of the character may be configured to be a high-quality region, and the remaining regions are medium-quality regions or low-quality regions. Similarly, when the user's angle of sight is focused on the lower body region of the character, such as shoes, the corresponding region of the character may be configured to be a high-quality region, and the remaining regions are medium-quality regions or low-quality regions.

In an example embodiment, when the quality level of each space region is determined, the space region corresponding to the position that the user pays attention to is configured to be of a higher quality level, and the remaining space region is configured to be of a lower quality level. For example, for a three-dimensional point cloud model of a large scene, for example, a virtual reality museum, the user may interact with a surrounding three-dimensional point cloud scene and a nearby three-dimensional point cloud object in an exhibition region. The exhibition region that the user pays attention to based on the user's angle of sight may constantly change. At this time, the exhibition region that the user pays attention to is configured to be a high-quality region, and the remaining regions are medium-quality regions or low-quality regions. The feedback information of the user may include request information for indicating the position and/or information that the user pays attention to.

3. The step of selecting point cloud data is performed in the point cloud data selection module.

The point cloud data of each component track is selected according to the joint quality level of the component track group of the space region and/or the quality level of each component track, thereby forming the point cloud data of the component track group of the space region and generating the media code stream.

In an example embodiment, each original point cloud is divided into different space regions. The point cloud data of the component track group of the space region is selected according to the joint quality level of the component track group of the space region and/or the quality level of each component track to generate the media code stream.

In an example embodiment, each original point cloud is pre-divided into multiple space regions. The component track groups in each space region are coded separately according to different joint quality levels. For example, when the point cloud data is divided into three quality levels, in the space region of each original point cloud, the component track selects high-quality point cloud data, medium-quality point cloud data, and low-quality point cloud data respectively. Through different combinations of each component track, there are multiple different joint quality levels for the component track groups in the space region, and different component track groups are pre-coded. After the joint quality level of the component track groups in the space region is determined, the media code streams of the pre-coded component track groups are directly selected.

When it is only necessary to transmit the media code stream of one component track group in one space region, the media code stream of the component track group is used as the media code stream of the space region. When it is necessary to transmit the media code streams of multiple component track groups in one space region, the media code streams of multiple component track groups are used as the media code stream of the space region.

When there is only one original point cloud, the media code stream of each space region of the original point cloud is put together to form the media code stream of the original point cloud. When there are multiple original point clouds, the media code stream of each space region of each original point cloud is put together to form the media code streams of the multiple original point clouds.

4. The step of determining the quality indication information is performed in the quality indication information determination module. After point cloud data is selected, it is necessary to generate the quality indication information of the space region to indicate the selected point cloud data. In addition to quality level information (joint quality level of the component track group and the quality level of the component track of the space region), quality indication information also includes any one or more of the following: the number of space regions, the identifier of the space region, the position of the space region, the dimension of the space region, the size of the space region, the number of component tracks of the space region, the identifier of a component track of the space region, the type of a component track group of the space region, the number of component track groups of the space region, or the identifier of the component track group of the space region, and an identifier of whether the dimension of the space region is identified.

When there is only one original point cloud, the quality indication information of each space region of the original point cloud is determined. When there are multiple original point clouds, the quality indication information of each space region of each original point cloud is determined separately.

In an example embodiment, when an original point cloud is divided into different space regions, the number of space regions is determined. The number of space regions of an original point cloud may be the same as or different from the number of quality levels of point cloud data included in the original point cloud. In the former case, the quality level of each space region is different. In the latter case, multiple space regions may be determined to be of the same quality level.

In an example embodiment, when an original point cloud is divided into different space regions, the position of the space region is determined. The position may be represented by three-dimensional coordinates.

In an example embodiment, when an original point cloud is divided into different space regions, the dimension of the space region is determined. A space region unit may be a piece of point cloud data or a space region of a cuboid, cylinder, or sphere.

In an example embodiment, when an original point cloud is divided into different space regions, the size of the space region is determined. Each space region may have the same size or may be configured to have a different size.

In an example embodiment, when an original point cloud is divided into different space regions, the size of the space region is determined. Multiple space regions may overlap with each other or may be configured not to overlap.

The relevant fields or characters added may be represented below.

region_quality_ranking indicates the quality level of a space region in a point cloud.

Component_track_quality_ranking indicates the joint quality level of all component tracks in the component track group in a space region in the point cloud.

num_regions indicates the number of three-dimensional space regions in the point cloud.

num_packed_track indicates the number of component tracks of the space region.

packed_track_id indicates the identifier of a component track of the space region.

num_track_groups indicates the number of component track groups of the space region.

component_track_group_id indicates the identifier of the component track group of the space region.

3DspatialRegionStruct indicates a point or a space region in a single original point cloud, including the x coordinate, y coordinate, and z coordinate of an anchor point and cuboid_dx, cuboid_dy, and cuboid_dz indicating the range of the region. The fields included are as follows.

dimensions_included_flag indicates an identifier of whether the dimension of the space region is identified. If the dimension of the space region is the same as the dimension of the first 3DSpatialRegionStruct instance having the same 3d_region_id (for example, in the previous sample or in V3CSpatialRegionsBox), and the dimension of the space region is specified in at least one 3DSpatialRegionStruct instance, dimensions_included_flag should be set to 0.

3d_region_id indicates the identifier of the space region.

anchor indicates a 3D point in the Cartesian coordinate system used as the anchor of a 3D space region, which is indicated by 3DPoint ( ).

Fields included in 3DPoint ( ) are as follows.

x, y, and z indicate the x coordinate value, z coordinate value, y coordinate value of a 3D point in the Cartesian coordinate system.

CuboidRegionStruct ( ) indicates a cuboid region in the Cartesian coordinate system. The fields included are as follows.

bb_dx, bb_dy, and bb_dz indicate the extensions of the next 3D space region with respect to an anchor point in the x axis, y axis, and z axis in the Cartesian coordinate system.

For ease of description, reference is made to the description of a set of indication information described above. However, when the example is implemented, other information may also be used.

For example, an implementation is as follows.

```
Aligned (8) class V3CSpatialRegionsBox extends FullBox ('vpsr', 0, 0) {
bit (1) all_tiles_in_single_track_flag;
bit (7) reserved = 0;
unsigned int (16) num_regions;
for (i = 0; i < num_regions; i++) {
unsigned int (8) region_quality_ranking;
3dSpatialRegionStruct (1);
if (all_tiles_in_single_track_flag) {
a.          unsigned int (8) num_track_groups;
b.          for (j = 0; j < num_track_groups; j++) {
    i.          unsigned int (8) component_quality_ranking;
    ii.         unsigned int (32) component_track_group_id;
    iii.        unsigned int (8) num_tiles;
    iv.         for (k = 0; k < num_tiles; k++) {
        1.              unsigned int (16) tile_id;
    v.          }
    vi.         }
c.          } else {
    i.          unsigned int (8) num_tile_tracks;
    ii.         for (j = 0; j < num_tile_tracks; j++) {
    iii.        unsigned int (32) tile_track_id;
    iv.         }
d.          }
e.          }
```

For example, another implementation is as follows.

```
aligned (8) class V3CSpatialRegionsBox extends FullBox ('vpsr', 0, 0) {
unsigned int (16) num_regions;
for (i = 0; i < num_regions; i++) {
a.          3DSpatialRegionStruct (1);
    1.              unsigned int (8) region_quality_ranking;
```

-continued

```
b.          unsigned int (8) num_track_groups;
c.          for (j = 0; j < num_track_groups; j++) {
    i.              unsigned int (32) track_group_id;
            a.              unsigned int (8) component_quality_ranking;
    ii.             unsigned int (16) nal_group_id;
d.          }
e.          unsigned int (8) num_objects;
f.          unsigned int (8) obj_idx_length;
g.          for (j = 0; j < num_objects; j++)
    i.              unsigned int (obj_idx_length * 8) soi_object_idx;
h.          }
    }
    }
```

When the example of the present application is implemented, only one or both of the region_quality_ranking and component_quality_ranking may be used.

When the example of the present application is implemented, one or more of the example embodiments described above may be selected and implemented in combination.

5. The step of describing an attribute is performed in an attribute description module.

After point cloud data is selected, an indication attribute identifier needs to be generated to indicate whether the selected point cloud is composed of point cloud data of different space regions and different quality levels. Different quality levels include one or a combination of the following situations: (1) There are different quality levels for different types of point cloud data included in a component track; (2) there are different quality levels of point cloud data for component tracks included in a component track group; and (3) there are multiple different joint quality levels in multiple component track groups in a space region.

In an example embodiment, when the selected to-be-transmitted point cloud is composed of point cloud data of different space regions, no matter whether the to-be-transmitted point cloud is composed of point cloud data of different quality levels, a value is assigned to the indication attribute identifier of the to-be-transmitted point cloud. When the selected to-be-transmitted point cloud is composed of point cloud data of only one space region, another value is assigned to the indication attribute identifier of the to-be-transmitted point cloud.

In an example embodiment, the indication attribute identifier of a point cloud having point cloud data of different space regions and different quality levels is set to v3c_srqr. In a transmission signaling, one or more of the fields below may be added reasonably as needed.

V3C_information_descriptor ( ) indicates the descriptor of the point cloud content.

descriptor_tag indicates the type of descriptor.

descriptor_length indicates the byte length from the next byte of the field to the last byte of the descriptor.

v3c_srpr_flag indicates the existence of a point cloud having point cloud data of different quality for different regions.

V3CspatialRegionsBox indicates the space region in the point cloud.

Details are listed in the table below.

| Grammar | Value | Number of Bits | Type |
|---|---|---|---|
| V3C_information_descriptor ( ){ | | | |
| descriptor_tag | | 16 | uimsbf |

-continued

| Grammar | Value | Number of Bits | Type |
|---|---|---|---|
| descriptor_length | | 8 | uimsbf |
| v3c_srpr_flag | | 1 | bslbf |
| reserved | | 7 | bslbf |
| if (v3c_srpr_flag) { | | | |
| V3CSpatialRegionBox | | | |
| } | | | |
| } | | | |

When an original point cloud is composed of point cloud data of different space regions and different quality levels, v3c_srpr_flag is set to 1, and V3CSpatialRegionBox is used to indicate each space region. When an original point cloud is composed of point cloud data of different space regions and one quality level, v3c_srpr_flag is set to 1, and V3CSpatialRegionBox is used to indicate each space region. Otherwise, v3c_srpr_flag is set to 0.

One to-be-transmitted point cloud corresponds to one indication attribute identifier. The indication attribute identifier of the to-be-transmitted point cloud is written into the media code stream formed by the to-be-transmitted point cloud.

6. The step of encapsulating is performed in the encapsulation module.

The quality indication information and/or the indication attribute identifier of the space region of the to-be-transmitted point cloud is written into the media code stream formed by the selected point cloud data of the space region of the to-be-transmitted point cloud.

The quality indication information of the space region of the to-be-transmitted point cloud is written into the media code stream corresponding to the space region of the to-be-transmitted point cloud. The media code stream corresponding to each space region of a to-be-transmitted point cloud is placed together to form the media code stream of the to-be-transmitted point cloud. The indication attribute identifier may be written into the media code stream of the point cloud and may also uniformly exist in the quality indication information of the space region.

When the determined relevant point cloud is only one to-be-transmitted point cloud, the quality indication information and/or the indication attribute identifier of the space region is written into the media code stream formed by the point cloud data selected from the corresponding space region. When the determined relevant point clouds are multiple to-be-transmitted point clouds, the preceding encapsulation step is performed for each to-be-transmitted point cloud.

7. The step of transmitting is performed in the transmission module.

The media code stream is transmitted to the receiving end.

Corresponding to the transmission method, the receiving end performs a three-dimensional point cloud receiving method. The method includes the steps below.

The indication attribute identifier of a point cloud is parsed from the received media code stream. Whether the received point cloud is composed of point cloud data in different space regions is determined. The step is performed in the identifier parsing module.

When the determination result is yes, the quality indication information of each space region of the to-be-transmitted point cloud is parsed. The step is performed in the quality indication information parsing module.

The media code stream is decoded in combination with the indication attribute identifier of a point cloud and/or the quality indication information of each space region to obtain point cloud data. The step is performed in the decoding module.

The decoded point cloud data is rendered and presented. This step is performed in the rendering module.

The client decapsulates a data code stream. If there are overlapping portions in different space regions of the received point cloud, high-quality point cloud data is selected from the overlapping portions according to the quality indication information of the space region and the selected point cloud data is rendered.

Since a human eye is sensitive to only information in a certain angle in the field of view, when the user consumes a point cloud media file, the decrease of the point cloud quality in a low attention region may not affect the overall perceived quality. Generally, data volumes corresponding to point clouds of different qualities are different. The data volume corresponding to a high-quality point cloud is also larger. Thus, the encapsulation information of three-dimensional point cloud media data is expanded, so that different quality level information is allocated to different regions of a three-dimensional point cloud, and the point cloud data of different qualities is obtained in a coding process according to quality level information, thereby implementing the object of transmission of point cloud data of different quality for different regions. Finally, the data volume in a transmission process may be effectively reduced, and the bandwidth resource in the transmission process is saved.

Those skilled in the art know that in addition to implementing the system and its multiple apparatuses, modules, and units provided by the present application in a manner of a pure computer-readable program code, it is entirely possible to enable the system and its multiple apparatuses, modules, and units provided by the present application to perform the same functions in the form of logic gates, switches, application-specific integrated circuits, programmable logic controllers, and embedded microcontrollers by logically programming the method steps. Thus, the system and its multiple apparatuses, modules, and units provided by the present application may be considered as a hardware component, and the apparatuses, modules, and units included in the hardware component for implementing various functions may also be considered as structures in the hardware component. The apparatuses, modules, and units for implementing various functions may also be considered as either software modules for implementing methods or structures in the hardware component.

In the technical solutions of the present application, the encapsulation information of three-dimensional point cloud media data is expanded. The indication attribute identifier of a point cloud and the quality indication information of each space region are added to signaling. For an overlapping space region, the client may select higher-quality point cloud data for rendering according to the quality indication information of the space region. The methods and apparatuses provided in the present application reduce the volume of point cloud data during transmission.

What is claimed is:

1. A three-dimensional point cloud transmission method, comprising:

parsing point cloud data of an original point cloud and determining a quality level of a space region of a to-be-transmitted point cloud;

selecting point cloud data in the space region of the to-be-transmitted point cloud according to the quality level of the space region of the to-be-transmitted point cloud to generate a media code stream;

determining quality indication information of the space region of the to-be-transmitted point cloud according to the selected point cloud data in the space region of the to-be-transmitted point cloud and writing the quality indication information of the space region of the to-be-transmitted point cloud into the media code stream; and transmitting the media code stream, wherein the original point cloud is composed of point cloud data of different space regions and different quality levels, at least one space region of the to-be-transmitted point cloud is configured, each space region of the at least one space region comprises point cloud data of at least one quality level, and the quality indication information of the space region of the to-be-transmitted point cloud comprises the quality level of the space region of the to-be-transmitted point cloud;

wherein the each space region comprises at least one component track group, a component track group of the at least one component track group comprises at least one component track, each component track of the at least one component track comprises at least one type of point cloud data, each type of at least one type of point cloud data comprises at least one quality level, and determining the quality level of the space region of the to-be-transmitted point cloud comprises: determining a quality level of each component track in each component track group of the each space region of the to-be-transmitted point cloud; and determining a joint quality level of the each component track group in the each space region of the to-be-transmitted point cloud;

wherein the joint quality level of the each component track group is determined by the quality level of each component track comprised in the each component track group, and the quality level of the each component track is determined according to a quality level of the at least one type of point cloud data comprised in the each component track; and wherein selecting the point cloud data in the space region of the to-be-transmitted point cloud according to the quality level of the space region of the to-be-transmitted point cloud to generate the media code stream comprises:

selecting point cloud data of the component track comprised in the each component track group in the space region of the to-be-transmitted point cloud according to the joint quality level of the each component track group in the space region of the to-be-transmitted point cloud to form point cloud data of the each component track group in the space region of the to-be-transmitted point cloud to generate the media code stream.

2. The method according to claim 1, after determining the quality indication information of the space region of the to-be-transmitted point cloud, further comprising:

determining an indication attribute identifier of the to-be-transmitted point cloud according to the quality indication information of the space region of the to-be-transmitted point cloud; and writing the indication attribute identifier of the to-be-transmitted point cloud into the media code stream, wherein the indication attribute identifier of the to-be-transmitted point cloud is configured to refer to at least one of the following: whether the to-be-transmitted point cloud is composed of point cloud data of different space regions and different quality levels, or the space region comprised in the to-be-transmitted point cloud.

3. The method according to claim 1, wherein the quality indication information of the space region of the to-be-transmitted point cloud further comprises at least one of the following:

a number of space regions, an identifier of the space region, a position of the space region, a dimension of the space region, a size of the space region, a number of component tracks of the space region, an identifier of a component track of the space region, a type of a component track group of the space region, a number of component track groups of the space region, or an identifier of the component track group of the space region.

4. A three-dimensional point cloud receiving method, comprising:

parsing quality indication information of a space region of a received point cloud from a received media code stream;

decoding the media code stream according to the quality indication information of the space region of the received point cloud to obtain point cloud data of the received point cloud; and rendering the point cloud data of the received point cloud, wherein the point cloud data is point cloud data of different space regions and different quality levels of the received point cloud, and the quality indication information of the space region comprises a quality level of the space region;

wherein each space region of the received point cloud comprises at least one component track group, a component track group of the at least one component track group comprises at least one component track, each component track of the at least one component track comprises at least one type of point cloud data, each type of at least one type of point cloud data comprises at least one quality level, and the quality level of the space region of the received point cloud comprises: a quality level of each component track in each component track group of the each space region of the received point cloud and a joint quality level of the each component track group in the each space region of the received point cloud;

wherein the joint quality level of the each component track group is determined by the quality level of the each component track comprised in the each component track group, and the quality level of the each component track is determined according to a quality level of the at least one type of point cloud data comprised in the each component track; and wherein the media code stream is generated by selecting point cloud data of the component track comprised in the each component track group in the each space region of the received point cloud according to the joint quality level of the each component track group in the each space region of the received point cloud to form point cloud data of the each component track group in the each space region of the received point cloud.

5. The method according to claim 4, before parsing the quality indication information of the space region of the received point cloud from the received media code stream, further comprising:

parsing an indication attribute identifier of the received point cloud from the received media code stream and determining whether the received point cloud is composed of the point cloud data of the different space regions according to the indication attribute identifier of the received point cloud.

6. A three-dimensional point cloud transmission apparatus, comprising: at least one processor; and a memory communicatively connected to the at least one processor; wherein the memory stores instructions executable by the at least one processor, and the instructions are executed by the at least one processor to cause the at least one processor to perform the following steps:

parsing point cloud data of an original point cloud;

determining a quality level of a space region of a to-be-transmitted point cloud;

selecting point cloud data in the space region of the to-be-transmitted point cloud according to the quality level of the space region of the to-be-transmitted point cloud to generate a media code stream;

determining quality indication information of the space region of the to-be-transmitted point cloud according to the selected point cloud data in the space region of the to-be-transmitted point cloud;

writing the quality indication information of the space region of the to-be-transmitted point cloud into the media code stream; and transmitting the media code stream, wherein the original point cloud is composed of point cloud data of different space regions and different quality levels, at least one space region of the to-be-transmitted point cloud is configured, each space region of the at least one space region comprises point cloud data of at least one quality level, and the quality indication information of the space region of the to-be-transmitted point cloud comprises the quality level of the space region of the to-be-transmitted point cloud;

wherein the each space region comprises at least one component track group, a component track group of the at least one component track group comprises at least one component track, each component track of the at least one component track comprises at least one type of point cloud data, each type of at least one type of point cloud data comprises at least one quality level, and determining the quality level of the space region of the to-be-transmitted point cloud comprises: determining a quality level of each component track in each component track group of the each space region of the to-be-transmitted point cloud; and determining a joint quality level of the each component track group in the each space region of the to-be-transmitted point cloud;

wherein the joint quality level of the each component track group is determined by the quality level of each component track comprised in the each component track group, and the quality level of the each component track is determined according to a quality level of the at least one type of point cloud data comprised in the each component track; and wherein selecting the point cloud data in the space region of the to-be-transmitted point cloud according to the quality level of the space region of the to-be-transmitted point cloud to generate the media code stream comprises:

selecting point cloud data of the component track comprised in the each component track group in the space region of the to-be-transmitted point cloud according to the joint quality level of the each component track group in the space region of the to-be-transmitted point cloud to form point cloud data of the each component track group in the space region of the to-be-transmitted point cloud to generate the media code stream.

7. The apparatus according to claim 6, wherein the instructions are further executed by the at least one processor to cause the at least one processor to perform, after determining the quality indication information of the space region of the to-be-transmitted point cloud, the following steps:

determining an indication attribute identifier of the to-be-transmitted point cloud according to the quality indication information of the space region of the to-be-transmitted point cloud; and writing the indication attribute identifier of the to-be-transmitted point cloud into the media code stream, wherein the indication attribute identifier of the to-be-transmitted point cloud is configured to refer to at least one of the following: whether the to-be-transmitted point cloud is composed of point cloud data of different space regions and different quality levels, or the space region comprised in the to-be-transmitted point cloud.

8. The apparatus according to claim 6, wherein the quality indication information of the space region of the to-be-transmitted point cloud further comprises at least one of the following:

a number of space regions, an identifier of the space region, a position of the space region, a dimension of the space region, a size of the space region, a number of component tracks of the space region, an identifier of a component track of the space region, a type of a component track group of the space region, a number of component track groups of the space region, or an identifier of the component track group of the space region.

9. A three-dimensional point cloud receiving apparatus, comprising:

at least one processor; and a memory communicatively connected to the at least one processor;

wherein the memory stores instructions executable by the at least one processor, and the instructions are executed by the at least one processor to cause the at least one processor to perform the method of claim 4.

10. The apparatus according to claim 9, wherein the instructions are further executed by the at least one processor to cause the at least one processor to, before parsing the quality indication information of the space region of the received point cloud from the received media code stream, parse an indication attribute identifier of the received point cloud from the received media code stream and determine whether the received point cloud is composed of the point cloud data of the different space regions according to the indication attribute identifier of the received point cloud.

11. A non-transitory computer-readable storage medium, storing a computer program, wherein when executing the computer program, a processor performs the transmission method according to claim 1.

12. A non-transitory computer-readable storage medium, storing a computer program, wherein when executing the computer program, a processor performs the receiving method according to claim 4.

* * * * *